June 9, 1953 R. K. THOMPSON, JR 2,641,348
FRAUD PREVENTION DEVICE
Filed Dec. 6, 1950 2 Sheets-Sheet 1
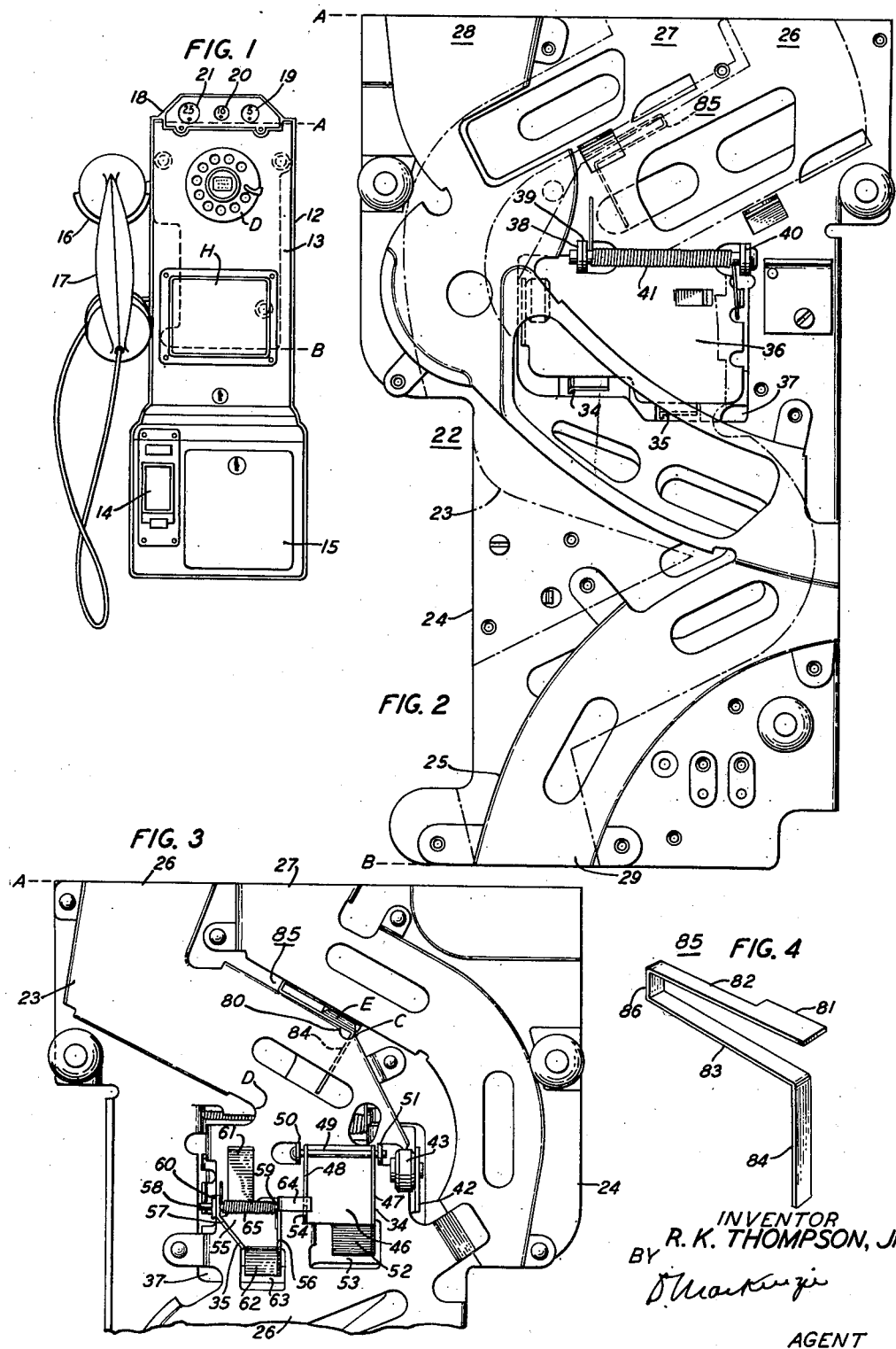
INVENTOR
R. K. THOMPSON, JR.
BY
AGENT June 9, 1953     R. K. THOMPSON, JR     2,641,348
FRAUD PREVENTION DEVICE Filed Dec. 6, 1950     2 Sheets—Sheet 2

INVENTOR
R. K. THOMPSON, JR.
BY
*D. Mackenzie*
AGENT

Patented June 9, 1953

2,641,348

UNITED STATES PATENT OFFICE 2,641,348

FRAUD PREVENTION DEVICE

Richard K. Thompson, Jr., Springfield, N. J., assignor to Bell Telephone Laboratories, Incorporated, New York, N. Y., a corporation of New York Application December 6, 1950, Serial No. 199,445

1 Claim. (Cl. 194—103)

This invention relates to coin collector apparatus and, in particular, to such apparatus in which a coin chute is provided.

In a known type of telephone coin collector, in which provision is made for establishing a telephone service connection on payment into the collector of a dime or two nickels, it is possible to operate the apparatus by depositing in the nickel slot a cardboard disc of nickel size followed by a real nickel. This permits a fraud aggregating, in the course of a year, many dollars.

A general object of the present invention is to provide means for preventing the above-described fraud.

In the coin collector designed to operate responsively to the deposit of ten cents, when two true coins are successively deposited in the nickel slot the first is arrested at a finger and serves as an obstacle for the second, which bounces off from the first and finds its way to a second finger. The weight of the second coin opens the second finger which is mechanically so related to the first finger that the latter also opens, allowing the first nickel to follow the second through the remainder of the nickel chute.

If a light-weight disc of nickel size is first inserted in the nickel slot, it comes to rest at the first finger as would a true coin. A nickel now deposited will strike the disc and rebound to the second finger which it opens, and both light disc and true coin pass through.

Three portions compose the nickel chute between the coin slot and the chute exit near the bell; these are (a) a straight portion inclined downwardly to the caller's left from the slot to the first finger; (b) a portion concave upwards and inclined downwardly to the right from the first finger, passing the second finger, to the right-hand edge of the collector frame; (c) a portion concave downwards and inclined downwardly to the left from the frame edge to the exit. It is in the first portion that the present invention provides a deflecting spring, strong enough to deflect a light disc to the right and throw it to the second finger, but too weak to deflect a nickel. A deposited lighter cardboard disc rests against the second finger, but is too light to open it. A nickel now inserted comes to rest against the first finger and no operation of the collector takes place until a second nickel is deposited, to rebound from the first and fall on the disc at the second finger. The operation now takes place normally, except that the disc as well as the two nickels are collected in the coin hopper. The spring deflects only objects lighter than the true coin.

A specific object of the invention is thus to provide in a coin collector chute means for deflecting a spurious coin, or token, lighter than a true coin for which the chute is designed.

Another specific object of the invention is to provide, in a coin collector normally requiring at least ten cents deposited to operate it, means for preventing the operation of the collector when less than that amount is deposited.

The invention will be understood from the following description, read with reference to the accompanying drawings, in which:

Fig. 1 is a front elevation view of a coin collector including the invention;

Fig. 2 is a view on a larger scale than that of Fig. 1 of the coin chutes of the collector shown in Fig. 1, from in front of the collector;

Fig. 3 is a view similar to but reversed from that of Fig. 2, showing the upper portions of the coin chutes of Fig. 2, seen from behind;

Fig. 4 is a perspective view of the deflecting spring included in Figs. 2, 3 and 6;

In all figures, like numerals designate like parts.

Figure 6:
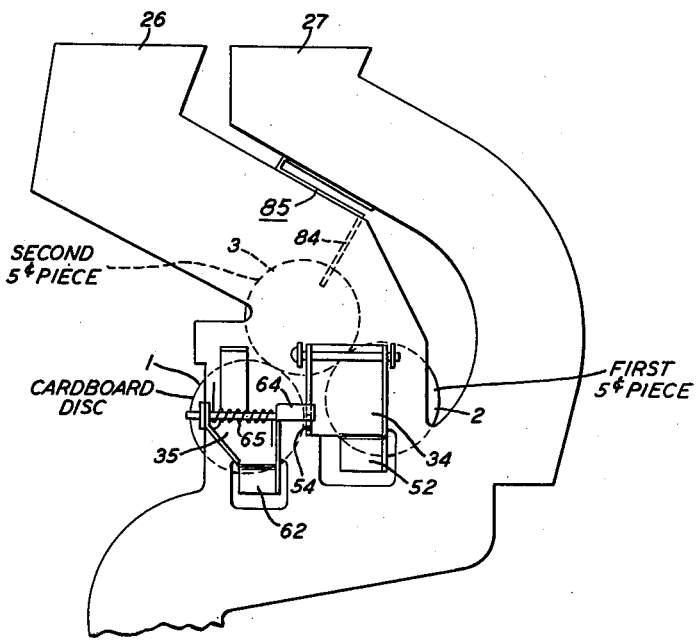
Fig. 6 is a view similar to Fig. 5 showing the nickel chutes occupied by a washer and two consecutive nickels when the deflecting spring is used.

As will appear, the structural features of the present invention are indicated in bold outline, dashed or full, in Figs. 2, 3 and 6.

Referring now to Fig. 1, a telephone coin collector 12 comprises a casing 13 with coin refund opening 14 and door 15; behind door 15 is the coin collection box, not shown. A switchhook 16 extends from casing 13 to support a telephone instrument 17, on the user's left. A top casing 13 is coin gage 18 in which coins may be inserted; three apertures 19, 20 and 21 are formed in gage 18 to receive respectively nickels, dimes and quarters deposited to obtain and pay for the telephone connection desired.

Below gage 18 appears dial D, and below the dial is the instruction card holder H. Between the levels of lines A and B, Fig. 1, and within the coin collector casing is secured the coin chute 22 shown in Fig. 2 to a scale about five times that of Fig. 1.

In Fig. 2, the upper and lower limits of chute 22 are designated A and B respectively, corresponding to the like lettered levels in Fig. 1.

Chute 22 is supported in casing 13 inclined forwardly toward the caller. Chute 22, registering at the top with gage 18, is formed by assembled plates 23, 24 and 25, suitably stamped out of sheet stainless steel, and formed to provide runways 26, 27 and 28 for nickels, dimes and quarters, respectively. At the bottom of chute 22, numeral 29 indicates the point of exit of quarters, while nickels and dimes emerge from a like located exit at the rear in Fig. 2, concealed behind plate 24. Not shown are the bell and the gong, which are sounded by coins passing through the runways, nor the hopper into which the coins fall. The quarter passes between plates 25 and 24, the other coins between plates 24 and 23. Plate 23 is shown in dashed outline, rearward of plate 24 which extends between levels A and B.

A general understanding of this type of coin collector may be obtained by referring to United States Patent 1,043,219 to O. F. Forsberg, November 5, 1912.

Two pivotally supported fingers 34 and 35 and a similarly supported gate 36 control the passage of nickels through runway 26. In Fig. 2, gate 36 is shown in closed position, almost completely occupying an aperture formed in plate 24. Behind it (from the caller's viewpoint) are fingers 34 and 35, supported by flanges on plate 23, and bent at their lower extremities to project forward beneath the lower edge of gate 36.

When gate 36 is open, the forwardly turned end portions of fingers 34 and 35 will deflect a passing nickel to fall forward, through an opening in plate 25, to coin refund opening 14. When gate 36 is closed, the bent portions of fingers 34 and 35 prevent the passage of a nickel through runway 26 until the fingers are released, and it is arranged that this shall not happen until a second nickel has been deposited. When two nickels have been deposited in slot 19 the fingers are released and both nickels pass through the nickel runway and to the hopper. The coin collector is then enabled by apparatus not shown.

Nickel runway 26 is defined by plates 23 and 24 of chute 22, so inclined in casing 13 that plate 24 is on its lower side and is in effect the front wall of runway 26. Thus a nickel in falling through its runway will bear against plate 24. An aperture 37 of width greater than the diameter of a nickel is formed in plate 24, and gate 36, slightly smaller than the aperture, holds when closed the nickel in the runway. Extending from plate 24 are spaced supports 39 and 40 through apertures in which passes shaft 38 pivotally supporting gate 36. A spring 41, supported on shaft 38 and having ends respectively engaging plate 24 and gate 36, operates to urge gate 36 to a closed position. The operation of gate 36, to be opened when deposited nickels are to be returned is through a conventional linkage, not shown, between switchhook 16 and roller 43 shown in Fig. 3 carried on arm 42. The construction of the coin collector, to adapt it for operation only on ten cent initial deposits, is described in the copending application of Frederick A. Hoyt, "Coin Collector," filed March 12, 1948, Serial No. 14,589.

The pivotally supported fingers 34 and 35 are located in register with the aperture 37 and are mounted on the outer face of the wall 23. As viewed in Fig. 3, the finger 34 is located to the right of and slightly above the finger 35. The finger 34 has a plate-like body portion 46 with angularly extending side flanges 47 and 48 which are apertured to accommodate a shaft 49 mounted in spaced and apertured lugs 50 and 51 extending from the wall 23. The finger 34 is pivotally supported by means of a shaft 49 and the body portion 46 terminates at its lower end in a curved end portion 52 constructed and arranged to extend through an aperture 53 in the wall 23 and into the nickel runway 26. The flange 48 has an arm portion 54 extending in the same plane as the flange 48 and outwardly with respect to the flange 48 and the plate-like body portion 46. The finger 35 has a plate-like body portion 55 with angularly extending side flanges 56 and 57 which are apertured to accommodate a pin 58, extending through spaced and apertured lugs 59 and 60, extending from the wall 23. The plate-like body portion 55 is channel-shaped in cross-section and terminates at its upper end in a tongue portion 61 and at its lower end in a curved end portion 62 constructed and arranged to extend through an aperture 63 in the wall 23 and into the nickel runway 26. Extending outwardly and then laterally from the side flange 56 of the finger 35 and overlying the outer end of the arm portion 54 of the finger 34 is an arm portion 64 to hold the finger 34 against outward pivotal movement except when the finger 35 is moved as required. The finger 35 is pivotally supported on the pin 58 and a restoring spring 65 mounted on the pin 58 and engaging the finger 35 and the wall 23 serves to urge the finger 35 to such position that the end portion 62 is in the nickel runway 26 and the arm portion 64 bears against the outer end of the arm portion 54 of the finger 34. The arm portion 64 on the finger 35 and the arm portion 54 on the finger 34 cooperatively form a releasable latch means for the finger 34. Since the finger 34 is pivotally supported by the shaft 49 and the finger 35 is pivotally supported on the pin 58, the fingers 34 and 35 may be operated to swing outwardly with respect to the wall 23 to bring the end portions 52 and 62 of the respective fingers 34 and 35 out of the nickel runway 26. This outward movement of the fingers 34 and 35 is against the action of the spring 65 which normally urges the finger 35 inwardly with respect to the nickel runway 26 and by reason of the arm portion 64 overlying the outer end of the arm portion 54 urges the finger 34 inwardly with respect to the nickel runway 26. When the finger 35 is swung outwardly with respect to the wall 23, the arm portion 64 on the finger 35 moves out of the way of the arm portion 54 on the finger 34 and the finger 34 can then swing outwardly to clear the end portion 52 from the nickel runway 26.

Assume that a person proceeds to use the telephone coin collector to obtain a telephone call and that the telephone instrument 17 is resting on the switchhook 16. In this case, if a nickel is deposited in the coin gage 18, the nickel will fall through the coin gage 18 and into the coin chute 22 and will proceed down the coin chute 22 until the nickel reaches the relatively large aperture 37. The nickel will then fall through the aperture 37 and exterior of the coin chute 22 and into the coin refund opening 14 for return to the person who deposited the nickel. No telephone call can therefore be obtained with a nickel while the telephone instrument 17 is on the switchhook 16 and the gate 36 is open. In order to condition the coin chute 22 to prevent a nickel from falling out through the aperture 37, the telephone instrument 17 must be lifted to relieve the switchhook 16 from the weight of the telephone instrument 17.

Figure 5:
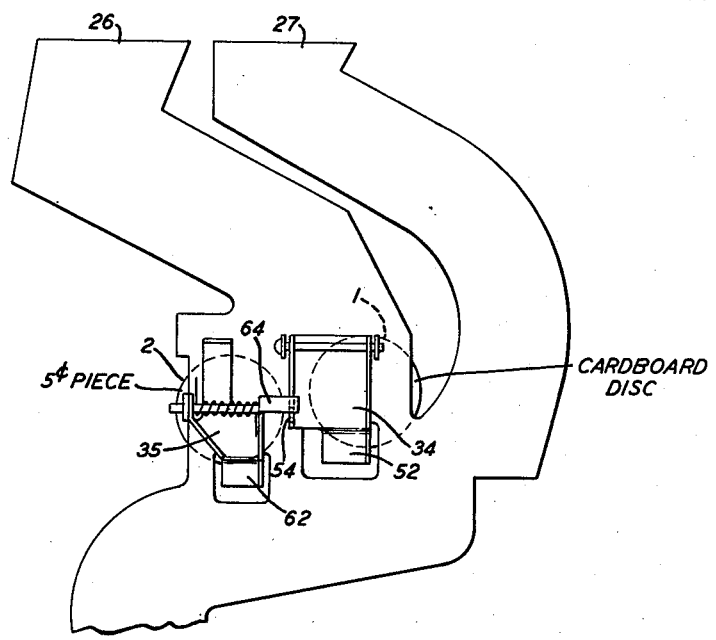
Fig. 5 is a skeleton view, from the rear, of part of the coin chutes for nickels and dimes showing the locations in the nickel chute of a cardboard washer and a following nickel, the deflecting spring being absent.

Assuming that the telephone instrument 17 is off the switchhook 16, the gate 36 will be closed under the action of the spring 41 since the pressure of the spring 41 is sufficient to move the gate 36 and the arm 42. When the gate 36 is closed and the nickel is deposited in the coin gage 18, the nickel will fall through the coin gage 18 into the coin chute 22. The nickel will then proceed down the coin chute 22 to the finger 34 and will rest on the end portion 52 of the finger 34 as shown in Fig. 5. The finger 34 is held against outward movement from the nickel runway 26 by the arm portion 64 of the finger 35 extending over and in engagement with the arm portion 54 on the finger 34, the finger 35 being under the pressure of the spring 65. The first nickel deposited after gate 36 is closed will be held by the finger 34 against full passage through the coin chute 22 until the finger 35 is moved to release the arm portion 64 from engagement with the arm portion 54. Under this condition, if a second nickel is deposited in the coin gage 18, the second nickel will go down through gage 18 and the coin chute 22 and strike the first nickel. The second nickel will roll off the edge of the first nickel to engage the finger 35 and its weight will then tilt the finger 35 outwardly from the nickel runway 26 against the action of the spring 65. The finger 35 will allow the second nickel to pass downward through the coin chute 22 and the finger 34 will be tilted outward under the weight of the first nickel to let the first nickel proceed down the coin chute 22 since the tilting of the finger 35 under the action of the second nickel causes the arm portion 64 to move out of engagement with the arm portion 54 on the finger 34. Both the first and the second deposited nickel will proceed on down through the coin chute 22. The nickels will subsequently, in the usual manner, cause a signal to be sent to a telephone central office to indicate that a telephone call is desired. It will be seen therefore that a telephone connection can be obtained from the coin collector apparatus 12 to a telephone central office by removing the telephone instrument 17 from the switchhook 16 and then depositing two nickels in the telephone coin collector 12.

The foregoing description is of the honest operation of the coin collector. Fraudulent operation may be effected by the insertion into runway 26 of a cardboard disc of the shape and size of a nickel followed by the insertion of a true nickel.

Fig. 5 illustrates the manner in which such fraudulent operation succeeds. Cardboard disc 1 is dropped into slot 19, enters runway 26 and comes to rest against finger 34 which remains closed as is normal. Nickel 2 is then dropped into slot 19 and follows the usual course to strike disc 1 and rebound to engage finger 35. Here its weight tilts outward finger 35, lifting arm 64 from engagement with arm 54. If the cardboard disc is heavy enough to deflect finger 34, both true nickel and disc proceed down through runway 26 establishing connection with the central office just as if two genuine nickels had been used.

In both honest and cheating operation, provision is made in the collector of which chute 22 forms a part to permit overtime change to be paid a nickel at a time, just as in the case where the initial change is only five cents. This provision includes means, operable after the telephone connection has once been completed, to deflect each additional five cent piece past the trap closed by finger 34 and allow it to fall directly against finger 35, thus at once passing down runway 26. Such means, not herein shown because not part of the present invention, are described and claimed in the copending application of Frederick A. Hoyt, Serial No. 46,099, filed August 25, 1948, "Coin Collector."

The provision made by the present invention for defeating the attempt to obtain by fraud a telephone connection is to introduce deflecting spring 85, Figs. 2, 3, 4 and 6, in the path of a coin or disc traveling downward from slot 19 toward finger 34. It will be noted that runway 26 is formed with a sharp change in direction at the point C, Fig. 3. In turning the edges of plate 23 to enclose between that plate and plate 24 a pathway suitable for the passage of a nickel, a hole indicated at 80, Fig. 3, is left for manufacturing reasons. A like hole is left at D opposite C. The wall of runway 26 is, in the portion above C, parallel to and spaced from that of runway 27. Plate 24 is at E provided in manufacture with a stamped-out portion to engage a corresponding portion of plate 25; the latter is not indicated in Fig. 3.

Spring 85 is formed, as shown in Fig. 4, with portions 81, 82, 83 and 84. Portion 81 enters the aperture in plate 24 at E and thus serves to lock spring 85 in position lengthwise of the passage between the adjacent walls of runways 26 and 27. Legs 82 and 83, formed by doubly bending spring 85 at 86, are sprung apart to hold the spring snugly in the passage when downbent portion 84 of leg 83 has been inserted through the hole at 80 to extend athwart the greater part of the width of runway 26.

Spring 85 is, conveniently but not indispensably, formed of Phosphor bronze about 10 mils thick and one-eighth inch wide. Fig. 4 is drawn substantially to scale except that the thickness is relatively exaggerated. Portion 84 is at right angles to portion 83 and thus extends at right angles to the path of a cardboard disc or a nickel and more than half-way across that path. Its stiffness is such as to deflect a disc of cardboard over to finger 35, but insufficient to check a nickel.

The effect of spring 85 is displayed schematically in Fig. 6. Cardboard disc 1 deposited in slot 19 travels down the chute to be blocked by spring portion 84 which throws it to be trapped by finger 35. Spring 65 is too strong to be overcome by the weight of disc 1, and when a nickel 2 is dropped to follow disc 1, the deflecting spring yields and lets the nickel pass to finger 34. The attempt to cheat the collector fails, and another nickel 3 must be inserted. If the call is abandoned by the would-be cheater, return is made of his disc and nickel. Of course, the deflecting spring does not in any way interfere with an honest caller's attempt to reach the operator.

What is claimed is:

In a coin operated telephone substation, a housing, a coin gauge on said housing for the reception of coins, coin chutes in said housing communicating with said coin gauge at their upper ends and having their lower ends in juxtaposition with respect to a coin receiving hopper, means in said coin chutes for restraining coins traveling therein and operable to release upon deposit of two coins, and means for preventing operation of said restraining means by the combination of a legitimate coin and an object of less weight than such coin comprising a resilient spring member, of substantially U-shaped configuration, and having an extending finger thereon, positioned adjacent one of said chutes, said finger extending partway across said chute to provide a barrier between said gauge and said restraining means, said finger being stiff enough to stop an object of less weight than a legitimate coin but flexible enough to permit the passage of a legitimate coin, thereby preventing the release of the coin restraining means by said object, whereby a coin deposited after said object will deflect said finger and permit said coin to come to rest against said coin restraining means and a second deposited coin will engage said first coin, rebound therefrom, strike said object and cause the release of said coin restraining means, thereby permitting said object and said coins to pass through said coin chute.

RICHARD K. THOMPSON, Jr.

References Cited in the file of this patent

UNITED STATES PATENTS

| Number | Name | Date |
|---|---|---|
| 452,068 | Ashwell | May 12, 1891 |
| 471,053 | Henry | Mar. 5, 1892 |
| 1,327,678 | Larsen | Jan. 13, 1920 |
| 2,179,091 | Hoyt | Nov. 7, 1939 |
| 2,318,410 | Mills | May 4, 1943 |